United States Patent
Tomishima

[19]

[11] Patent Number: 5,926,447
[45] Date of Patent: Jul. 20, 1999

[54] METHOD FOR ENHANCING THE DATA ACCESS TIME IN AN OPTICAL DISC APPARATUS

[75] Inventor: Yuichiro Tomishima, Sendai, Japan

[73] Assignee: Samsung Electronics Co., Ltd., Rep. of Korea

[21] Appl. No.: 08/990,213

[22] Filed: Dec. 12, 1997

[30] Foreign Application Priority Data

Dec. 12, 1996 [JP] Japan ................................... 8-331972

[51] Int. Cl.$^6$ ....................................................... G11B 7/09
[52] U.S. Cl. .................................... 369/44.28; 369/44.34; 369/44.27
[58] Field of Search ............................ 369/44.27, 44.28, 369/44.29, 44.32, 44.34, 44.35, 44.36, 43, 47, 48, 54, 53, 58, 124

[56] References Cited

U.S. PATENT DOCUMENTS

5,136,569  8/1992  Fennema et al. ................ 369/44.27 X

*Primary Examiner*—Muhammad Edun
*Attorney, Agent, or Firm*—Dilworth & Barrese

[57] ABSTRACT

In an optical disk apparatus, a method for enhancing data access time during an access operation of an optical pickup to an access target track whereby an accuracy of feed seek is optimized while decreasing the number of times a track jump operation is performed. The method includes the steps of: determining a maximum operating range for a right-and-left movement of an optical system of the optical disk apparatus for a feed seek operation, when not performing a write or read operation; determining a track jump accuracy to obtain an optimal control condition that provides a track jumping operation from a starting track on a recording medium toward a target track of the recording medium at intervals corresponding to a number of tracks between the starting track and the target track, when not performing the write or read operation; and controlling the track jump operation by the optimal control condition based on results of the determined maximum operating range and results of the determined track jump accuracy during a write or read operation. The maximum operating range may be determined by detecting a signal of a focus system at a state where the focus control is not capable of being performed when the right-and-left movement of the optical system reaches an operating limitation which prevents the optical system from performing an up-and-down movement.

12 Claims, 6 Drawing Sheets

METHOD FOR ENHANCING THE DATA ACCESS TIME IN AN OPTICAL DISC APPARATUS

BACKGROUND OF THE INVENTION

1. Field of the Invention

The present invention relates to an optical disk apparatus and, in particular, to techniques for decreasing the data access time in an optical disk apparatus during a read or write operation thereof.

2. Description of the Related Art

Figure 5:
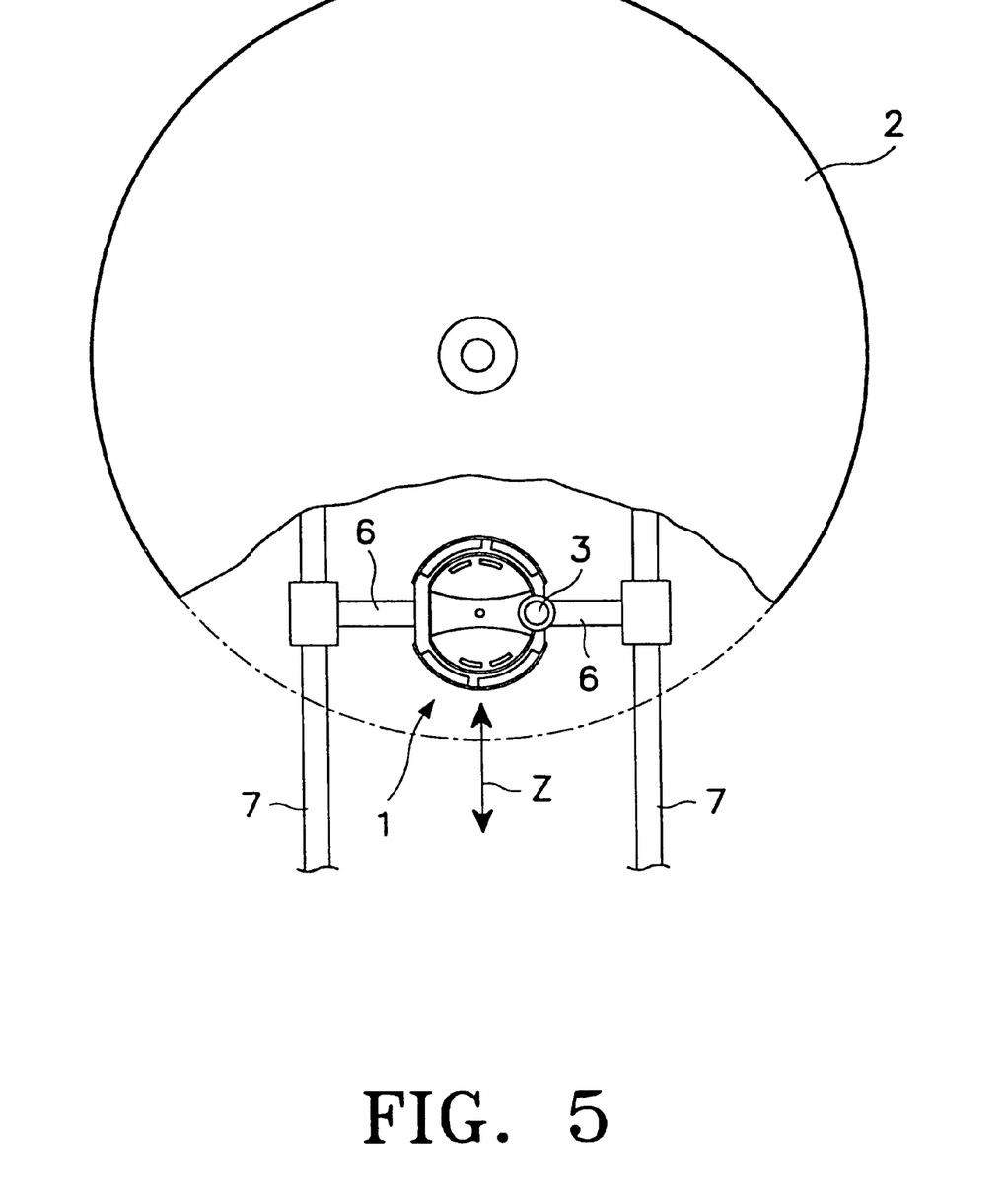
FIG. 5 is a schematic view showing the construction of an optical disk apparatus.
Figure 6:
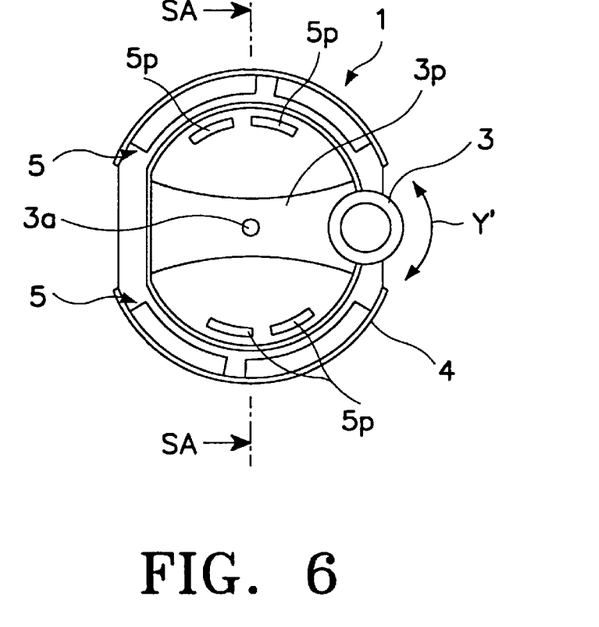
FIG. 6 is a schematic plan view showing an optical pickup.
Figure 7:
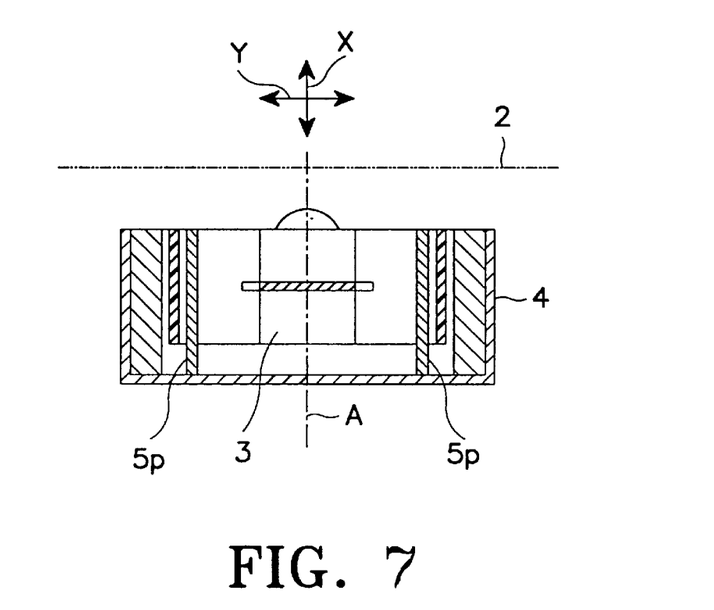
FIG. 7 is a sectional view of the optical pickup taken along line SA—SA of FIG. 6.

An optical disk apparatus includes an optical pickup having an optical system for writing and reading data to and from a recording medium. A general construction of an optical pickup 1 is shown in FIGS. 5–7. The optical pickup 1 includes an optical unit 3 for searching for a laser beam to read or write the data to be recorded along a track of a recording medium 2, and an optical system (not shown) for receiving a reflected light from the recording medium 2. The optical unit 3 is supported by a base 4 so as to be capable of moving in an up-and-down direction corresponding to an optical axis A, as indicated in FIG. 7 by arrow X, and moving in a right-and-left direction perpendicular to the optical axis A, as indicated in FIG. 7 by arrow Y. That is, the optical unit 3 is supported by the base 4 such that it can rock in a direction indicated by Y', and includes a supporting axis 3P as its starting point. The up-and-down movement (arrow X) of the optical unit 3 functions as a focus control for the recording medium 2, whereas the right-and-left movement of the optical unit (arrow Y) functions as a track jump to position the optical axis A on an access target track in the recording medium 2. In general, the above movements can be performed by electronics 5 disposed in the base 4. Further, as shown in FIG. 5, the optical pickup 1 is supported by an arm 6 which slides on a guide bar 7, thereby allowing the optical pickup 1 to move along the recording medium 2 by a driving system (not shown) in the direction indicated by arrow Z. This functions as a feed seek to roughly position the optical pickup 1 on a track near an access target track.

An access operation of the optical pickup 1 in the recording medium 2 can be performed by a feed seek operation followed by a track jump operation. Specifically, during such an operation, the optical pickup is roughly positioned on a track near the access target track through the feed seeking operation. Then, the optical axis is finally positioned on the access target track through the track jumping operation. By way of example, if a maximum operating range capability for track jumping in the right-and-left direction (arrow Y, FIG. 7) is set to 200 tracks, the optical pickup 1 is positioned on a track within 200 tracks from the access target track through the feed seeking operation. After that, position data, which is generally referred to as MSF (where M stands for minute, S stands for second and F stands for frame), of the track where the optical pickup is positioned through the feed seeking operation is read. The track jump operation is then performed for the number of tracks corresponding to the difference between the positioned track and the access target track. A driving control of the feed seek operation is performed by applying a voltage to a driving motor so as to position the optical pickup on a track within 200 tracks from the access target track. Therefore, because control conditions of the feed seek are determined by the maximum operating range for the track jump operation, if such range is narrow, the optical pickup can be positioned with high accuracy through the feed seeking operation. However, in order to position the optical pickup with such high accuracy through the feed seeking operation, it is necessary to employ a braking mechanism to control the movement speed of the optical pickup during the feed seek operation, or to stop the movement thereof, which provides for a longer time for performing the feed seek operation.

The maximum operating range of the track jump operation having an effect on the feed seek speed will now be explained in further detail. Referring to FIG. 6, the right-and-left movement (arrow Y, FIG. 7) of the optical system during the track jump operation is generally performed by electronic equipment 5. Such movement is regularly limited to operate in the mechanical structure of the electronic equipment, because a member 3P of the optical unit 3 reaches to an element 5P comprised of the electronic equipment 5. In this situation, it is impossible to perform the focus control of the optical pickup. Therefore, the maximum operating range for the track jump operation should be set below an operating limitation range, and the track jump operation should be performed within the maximum operating range.

The maximum operating range for the track jump operation has an important effect on the features of the electronic equipment in the optical disk apparatus or the supporting unit of the optical unit included therein. For this reason, an attempt to perform a track jump operation is conducted on every predetermined manufacturing lot. Based on the results of such attempt, the maximum operating range for the track jump is set, for example, in accordance with the maximum number of tracks to track jump, a maximum applied voltage to the electronic equipment, or the longest applied time of the voltage. However, the feature of the electronic equipment or the feature of the supporting unit of the optical unit depends upon the environmental conditions in which the optical disk apparatus is used. Therefore, if a previously set condition for the maximum operating range is not optimal, there is a phenomenon generated due to such improper condition which causes the maximum operating range to appear narrower than the operating limitation. In this case, the control condition for the feed seek operation is set in accordance with the maximum operating range which is narrower than the operating limitation. As a result, the feed seek operation is performed with high accuracy, but at the same time becoming unnecessarily longer for feed seeking.

Furthermore, the track jump operation can come into question itself. That is, the track jump is performed from the currently positioned track toward the access target track. Here, the right-and-left movement of the optical system (arrow Y, FIG. 7) for the track jump operation is controlled by a voltage control according to the number of tracks between the currently positioned track and the access target track. For example, if the number of tracks to be track jumped is about 100 tracks, the length of time in which to apply the voltage is set in correspondence with the above 100 tracks. As mentioned above, the true right-and-left movement (arrow Y, FIG. 7) of the optical system is affected by either the feature of the internal voltage applied to the optical disk apparatus or the feature of the supporting unit of the optical system included therein. For this reason, similar to the maximum operating range, an attempt to perform the track jump operation is performed on every predetermined manufacturing lot. Based on the results of such attempts, the optimal time for the applied voltage is previously set in accordance with the number of tracks to be track jumped. Since either the feature of the electronic equipment or the feature of the supporting unit of the optical unit is affected by the environmental conditions in which the optical disk apparatus is used, the accuracy of the track jump operation deteriorates as a result of the previously set time for applying voltage not being an actual optimal time. As a result, it is impossible to position the optical pickup on the access target track by performing the track jump operation just one time. Moreover, if the optical pickup is unable to be positioned on the access target track on one track jump operation, the track jump is repeatedly performed from the track which was first jumped to, and if the access target track is still not accessed, the track jump operation is repeatedly performed again. Consequently, this causes an unnecessary increase in the number of times that the track jump operation must be repeated.

As mentioned above, both the accuracy (speed) of the feed seek operation by the optical pickup and the number of times in which the track jump operation of the optical system must be performed has a direct effect on the access time for writing or reading data in the optical disk apparatus. Therefore, in order to decrease the access time, the accuracy of the feed seek operation should be optimized, and the optical pickup should be finally positioned on the access target track with a minimal number of track jump operations.

SUMMARY OF THE INVENTION

It is therefore an object of the present invention to provide an optical disk apparatus in which the accuracy of the feed seek operation is optimized and the number track jump operations is effectively decreased, thereby decreasing disk access time.

To achieve the above object, there is provided a method for writing and reading data to and from a plurality of tracks on a recording medium in an optical disk apparatus. The method uses an optical pickup having an optical system that is capable of moving up-and-down in a direction defined by an optical axis, for performing a focus-control of the optical system for the recording medium during the writing and reading operation. The optical pickup is also capable of moving right-and-left in a direction perpendicular to the optical axis, for performing a tracking control to position the optical axis of the optical system included in the optical pickup on an access target track. The tracking control first performs a feed seek operation to roughly position the optical axis of the optical system on the track near the access target track through movement of the entire optical pickup. A track jump operation is then performed to finally position the optical axis on the access target track. The method for decreasing the data access time of the optical disk apparatus includes the steps of determining a maximum operating range for the right-and-left movement of the optical system, when not performing either a write or read operation; determining a track jump accuracy to obtain an optimal control condition that provides a track jumping operation from a starting track toward a target track at intervals corresponding to a number of tracks between the starting track and the target track, when not performing a write or read operation; and controlling the track jump operation by the optimal control condition based on the results of the determined maximum operating range and the results of the determined track jump accuracy during a write or read operation.

These and other objects, features and advantages of the present invention will become apparent from the following detailed description of illustrative embodiments thereof, which is to be read in connection with the accompanying drawings. It is to be understood that same or similar components illustrated throughout the figures are designated with the same reference numeral.

DETAILED DESCRIPTION OF PREFERRED EMBODIMENTS

In the following description, specific numerical details such as components and frequencies are set forth merely to provide a more thorough understanding of the present invention, and should not be construed in any way as a limitation on the present invention. Indeed, it will be apparent to one of ordinary skill in the art that the present invention may be practiced without these specific details. A detailed description of known functions and constructions which are unnecessary to understand the present invention, and which would result in obscuring the subject matter of the present invention, will be avoided.

An embodiment of the present invention for determining the maximum operating range for track jump will now be explained in detail by way of an example. In order to determine the maximum operating range for a track jump operation, the number of track T1 is first set, which corresponds to a number of tracks below an operating limitation in which an optical pickup is capable of track jumping through a right-and-left movement. Next, the track jump operation will then be performed for the T1 through the right-and-left movement of an optical unit 3 included in the optical pickup 1 as shown in FIGS. 6 or 7. When a signal of a focus system remains unchanged during such operation, the track jump operation is then repeated for another track number T2, which adds a given number of tracks α (e.g., 10 tracks) to T1. If the signal of the focus system changes during the next track jump operation with respect to track T2, the maximum operating range is set to T2. On the other hand, if the signal of the focus system remains unchanged during the track jump operation with respect to track T2, another track jump operation will be performed for a track T3, which adds a given number of tracks α to T2. This process is repeated until the signal of the focus system changes. Here, a signal change of the focus system represents the state in which the optical unit 3 of FIG. 6 reaches element 5P of electronic equipment 5 through its right-and-left movement (arrow Y, FIG. 7). This operating limitation of the apparatus prevents the additional focus control of the optical pickup 1 (i.e., the state in which the focus servo is not operated).

Here, the maximum operating range is set to the maximum number of tracks which are capable of being jumped during the track jump operation within the operating limitation. Particularly, the maximum operation range is set to the track number Tx-1, which is equal to the track number Tx less a given number of tracks α where the signal of the focus system remained unchanged. Thereafter, a read or write operation may be performed based on a control for performing the track jump operation within the maximum determined operating range for such track jump operation. For example, assume that it is determined that a maximum operating range can be changed from a previously set number of tracks 200 to 300 tracks in the optical disk apparatus, the accuracy of the feed seek will be decreased from 200 tracks to 300 tracks and, therefore, the feed seek operation can be performed with higher speed, and the access time can be shortened accordingly.

Furthermore, it is helpful in manufacturing the optical disk apparatus to be able to set the maximum operating range for the track jump operation on a basis of the results determined in the above process. That is, in the process of manufacturing, if the goods are defective in attempting to track jump, the maximum operating range for the track jump according to the features of the goods can be set so that the defective goods can be used within the identified operating range, which results in an improved yield of product.

FIGS. 1(a) and 1(b) are diagrams showing the relationship between a track drive voltage and a focus-on signal used in determining the maximum operating range according to an embodiment of the present invention;

FIG. 1(a) shows a relationship between a track drive voltage and a focus-on signal in attempting to track jump within the operating limitation. FIG. 1(b) shows the relationship between the track drive voltage and the focus-on signal when attempting to track jump over the operating limitation. The track drive voltage Vd refers to an access voltage higher than a reference voltage Vf and to a brake voltage lower than the reference voltage Vf. By applying the access voltage and brake voltage for a predetermined time, the optical unit 3 of FIGS. 6 and 7 repeatedly moves right-and-left (arrow Y) to perform a track jump operation toward the given number of the track. Furthermore, the focus-on signal S generally maintains its voltage at constant level relative to the reference voltage Vf as shown in FIG. 1(a). When a focus control can not be performed, however, the focus-on signal voltage deteriorates as shown in FIG. 1(b).

Figure 2:
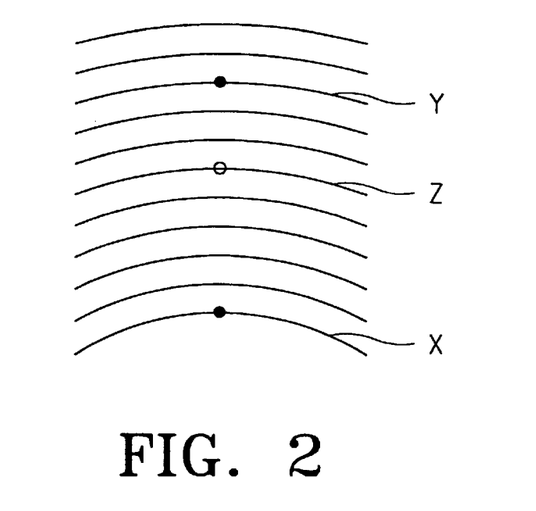
FIG. 2 is a diagram showing the relationship of a starting track or an access target track in determining the accuracy of the track jump operation.

Referring to FIG. 2, an embodiment of the present invention for determining the accuracy of a track jump will be described. As shown, when determining the accuracy of the track jump, a track jump operation is performed from a certain track X as the starting point toward the target track Y at intervals of a predetermined time MSF, that is, a predetermined number of tracks N. Here, a first attempt to track jump is performed under a constant applied voltage for a certain time. When the optical pickup is not positioned on target track Y but, instead, on another non-target track Z through the first attempt to track jump, the attempt thereto is performed again.

Figure 1:
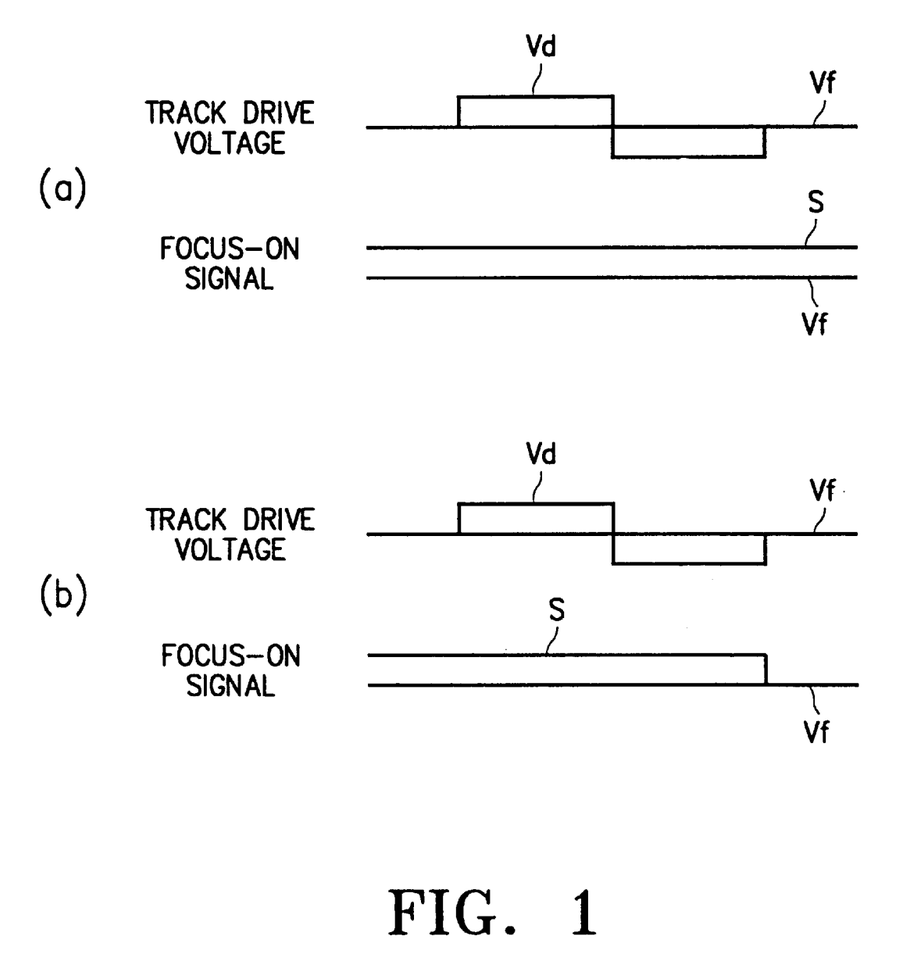
FIGS. 1(a) and 1(b) are diagrams showing the relationships between a track drive voltage and a focus-on signal used in determining the maximum operating range according to an embodiment of the present invention.

Furthermore, track X and track Y are set as the starting track and target track, respectively. Alternatively, another track at an interval of an Nth track from track Z may be set as the target track. In attempting to track jump again, the time in which the voltage is applied is different from the first attempt. As shown in FIG. 2, because track Z precedes track Y, the relationship between the access voltage and the brake voltage (as shown in FIG. 1) is changed to allow the applied time of the brake voltage to be shortened. In the case that the non-target track Z comes after the target track Y, the relationship therebetween is contrary to the foregoing. When the optical pickup is finally positioned on the target track after performing the track jump operations, the voltage applied condition is set as the optimal track jump condition for the predetermined number of tracks N to be track jumped. However, when the optical pickup is positioned on the non-target track, the track jump operation is repeatedly performed until the optical pickup is positioned on the target track.

Figure 3:
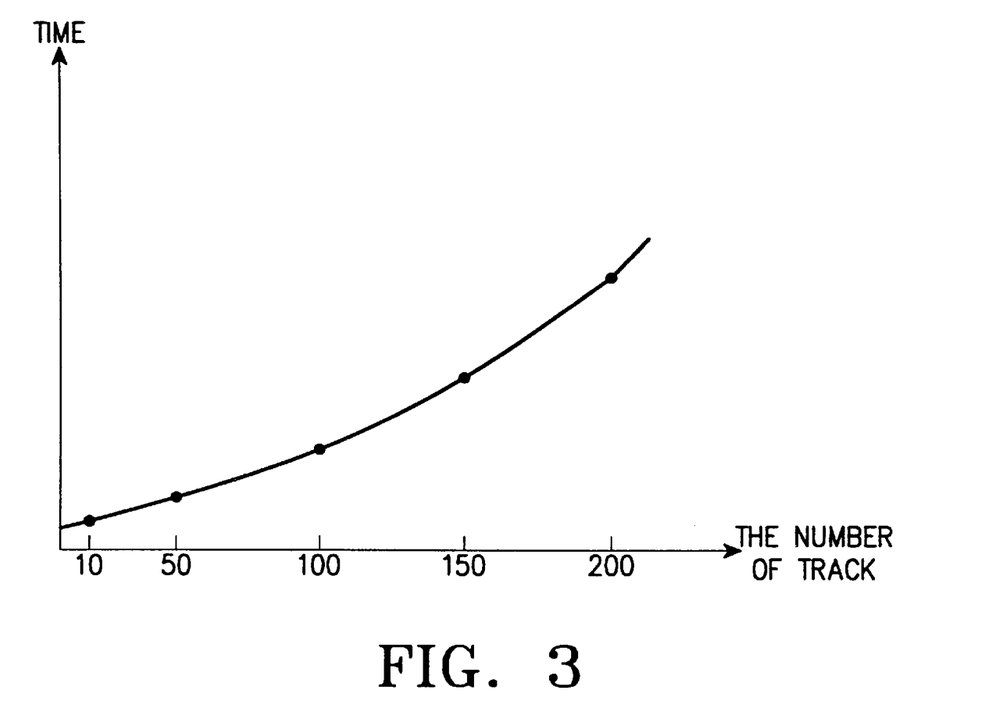
FIG. 3 is a graphical representation of the determined accuracy of a track jump.

For example, assume that the track jump operation is performed for cases, N=10, N=50, N=100, N=150 and N=200, respectively, and the optimal track jump condition is obtained for each of the above cases. Thereafter, based on those results, a table may be made with respect to the number of tracks to be track jumped versus the applied time of the voltage, as shown in FIG. 3. Then, the read or write operation determines the track jump condition on a basis of the above table. In the general optical disk apparatus, since a position deviation in feed seeking is about 200 tracks, the number of tracks to be track jumped is maximally obtained about 200 tracks through track jumping.

Figure 4A:
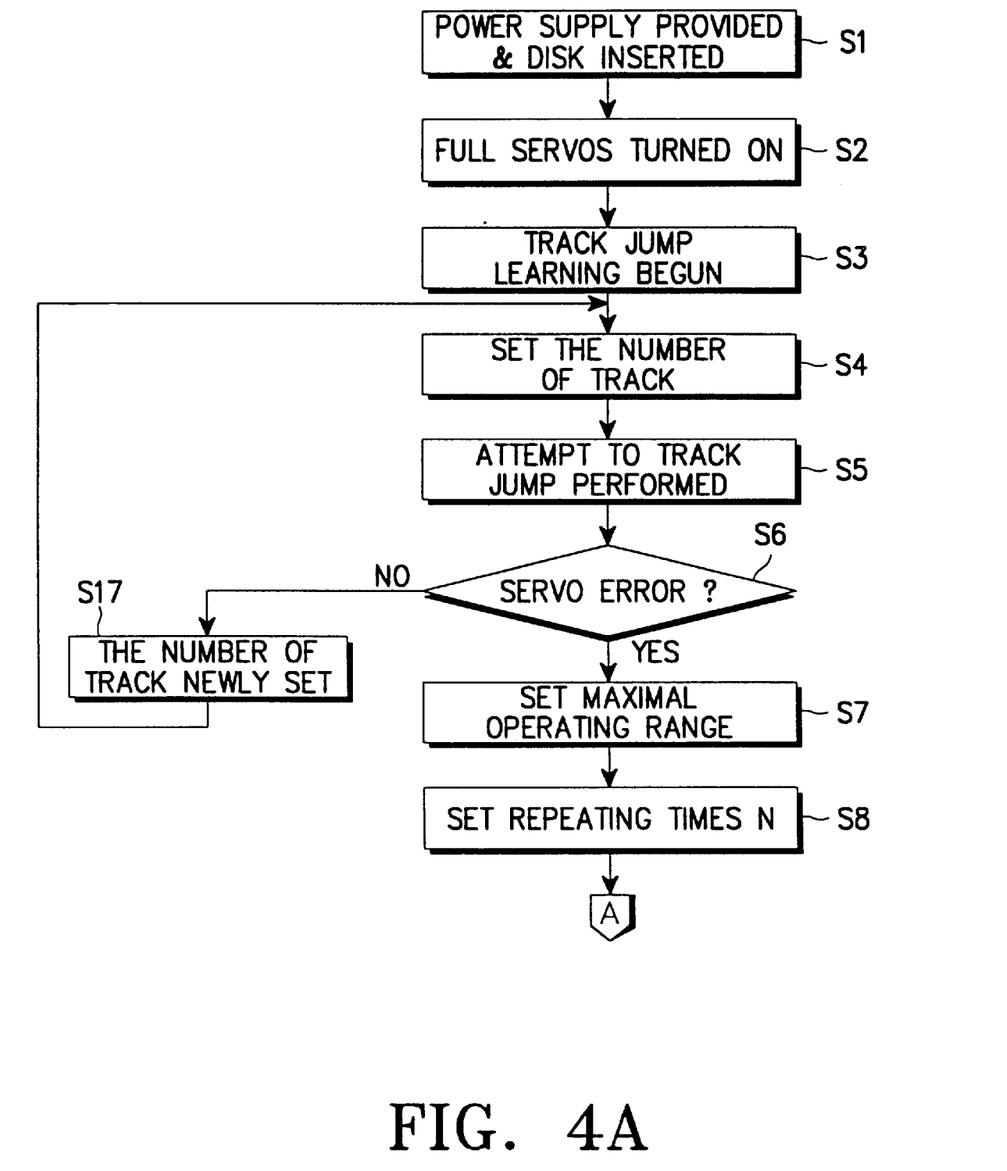
FIGS. 4a and 4b are flow charts showing the method of determining the track jump according to an embodiment of the present invention.
Figure 4B:
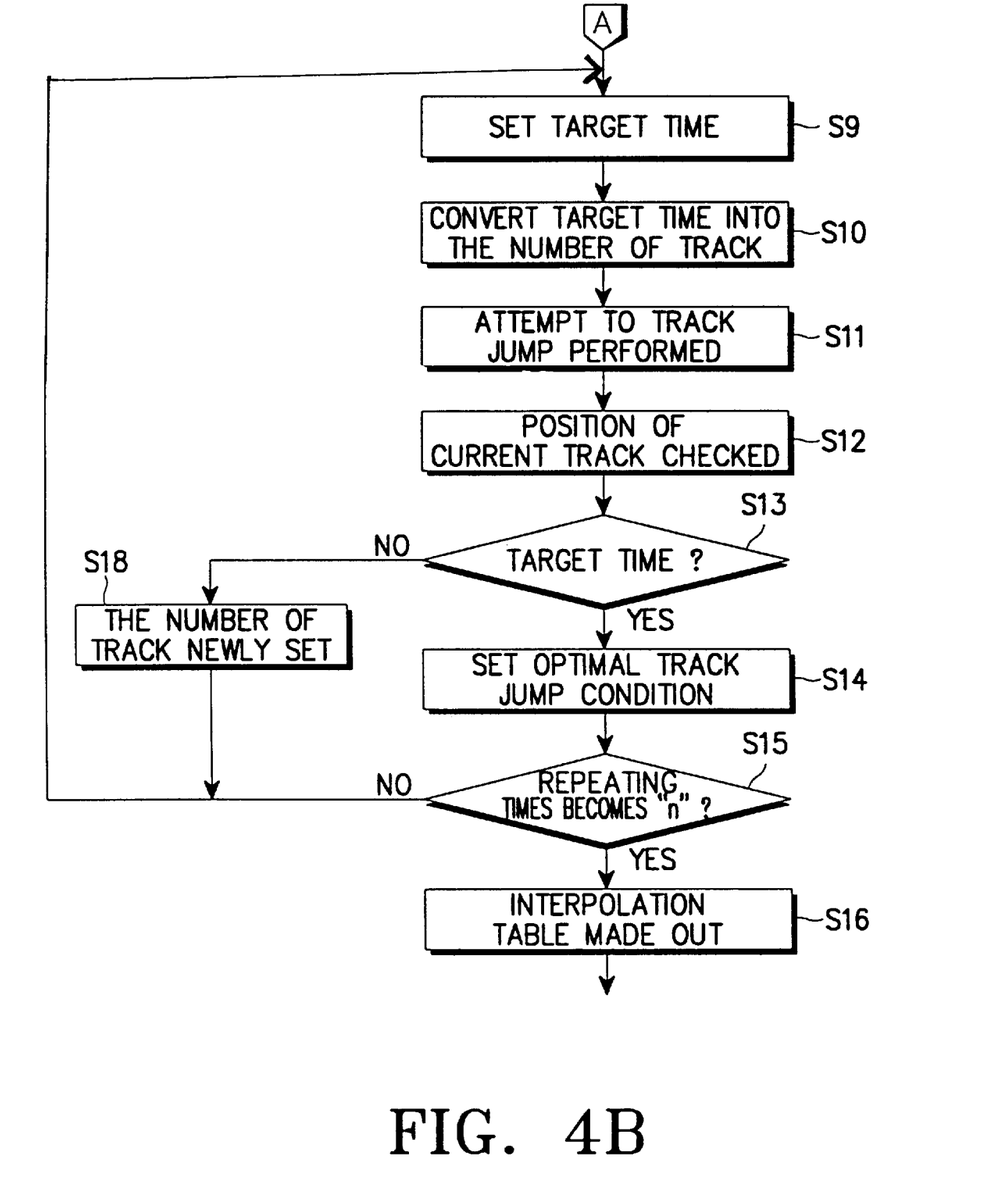

Referring to FIG. 4, a flow chart illustrating the procedure for determining a track jump according to an embodiment of the present invention is shown. This flow chart includes an embodiment in which an operating time zone of a power supply is provided. Here, the power supply is provided and a disk, i.e., a recording medium, is inserted (step S1). Next, full servos such as a feed seek servo, a focus servo and a track jump servo, are turned on (step S2). A procedure for determining the track jump is then initiated (step S3). The above procedure begins with determining the accuracy of the track jump together with determining the maximum operating range for the track jump.

The procedure for determining the maximum operating range for the track jump operation begins with setting the number of the track T1 (step S4). A track jump operation attempt corresponding to the track number T1 is performed (step S5). The results of the track jump operation is then checked (step S6). If a servo error is not found in step 6, a central processor unit (hereinafter, referred to as CPU) of the optical disk apparatus sets a new track number T2 (step S17), in which a predetermined number of tracks α is added to the above track number T1, and the process then returns to step S4. On the other hand, if a servo error is found in Step S6, the maximum operating range for the track jump is set (step S7).

Next, the number of times "n" for repeating the track jump is set (step S8). For example, if the track jump is performed for N=10, N=50, N=100, N=150 and N=200, respectively, the number of times to repeat such track jump "n" is set to 5. After that, referring to FIG. 4B, a target time is set (step S9), and then the target time is converted into the track number (step S10). In the step S10, the number of tracks N between the current track positioned by the optical pickup and the target track is first set at 10. The number N is used to determine the next track number. Thereafter, a track jump to the target track identified by the number of tracks N is performed (step S11). The position of the current track is then checked (step S12), and then the CPU checks whether or not the current track is the target track (step S13). If it is determined that the current track is not the target track, the CPU resets the track jump condition (step S18), and then returns to the step S9. However, if it is determined that the current track is the target track (step S13), then the set target time was accurately determined, and the optimal track jump condition is set for the corresponding number of tracks (step S14). Step S13 is repeated for the other number of tracks, e.g., N=50, N=100, N=150 and N=200. The CPU then determines whether or not the repeating times becomes "n" (step S15). If in step S15 the repeating times was not "n," the CPU returns to the step S9. If in step S15 the repeating times was "n," an interpolation table (FIG. 3) is made (step S16), and then the CPU performs its corresponding operation.

The process of determining the accuracy of the track jump as a means for setting the target time requires the MSF time to read the current track or the target track at the intervals of Nth track from the above current track. That is, the data for the number of the track to be track jumped, as well as the data for the access time, are necessary in determining the accuracy of the track jump.

The method for determining the maximum operating range and the accuracy of the track jump is performed by a control system included in the optical disk apparatus, which utilizes the CPU for read and control operations.

The aforesaid optical disk apparatus according to an embodiment of the present invention is not significantly affected by the feature of the right-and-left movement of the optical system included in the optical disk apparatus. In addition, the method optimizes the accuracy of the feed seek operation and can effectively decrease the repeating times for the track jump operation. For example, with the respect to the track jump operation, prior art devices must repeat the track jump operation more than two times to achieve about 90% accuracy in positioning the optical pickup on the access target track, whereas the present invention can position the optical pickup on the access target track with about 80% accuracy by performing only one track jump operation.

As apparent from the foregoing, the present invention can optimize the accuracy of the feed seek operation during the access operation of the optical pickup, and can effectively decrease the repeating times for the track jump operation, thereby resulting in a decrease in the access time.

While there have been illustrated and described what are considered to be preferred embodiments of the present invention, it is to be understood by those of ordinary skill in the art that various changes and modifications may be made to the present invention, and equivalents may be substituted for elements thereof, without departing from the true scope and spirit of the present invention. In addition, it is to be appreciated that many modifications may be made to adapt a particular situation to the teachings of the present invention without departing from the central scope thereof. Therefore, it is not intended that the present invention be limited to the particular embodiments disclosed as the best mode contemplated for carrying out the present invention, but that the present invention includes all embodiments falling within the scope of the appended claims.

What is claimed is:

1. A method for enhancing the access time in an optical disk apparatus for writing and reading data to and from a recording medium having a plurality of tracks, comprising the steps of:

determining a maximum operating range for a right-and-left movement of an optical system of said optical disk apparatus, said right-and-left movement being perpendicular to an optical axis of said optical system; and controlling a track jump operation by using a control condition derived from said determined maximum operating range during one of said writing and reading operations.

2. The method according to claim 1, wherein said step of determining the maximum operating range further comprises the step of detecting a change in a focus system signal generated by a focus control within said optical disk apparatus, when said focus control cannot be performed.

3. The method according to claim 2, wherein said detected focus system signal is not generated when said right-and-left movement of said optical system reaches an operating limitation preventing said focus control from performing an up-and-down movement along the optical axis of said optical system.

4. The method according to claim 1, wherein said maximum operating range is determined by detecting a change in a focus system signal at a state where a focus control is not capable of being performed when said right-and-left movement of said optical system reaches an operating limitation which prevents said optical system from performing an up-and-down movement along the optical axis of said optical system.

5. The method according to claim 1, wherein said step of determining a maximum operating range is not performed during the writing and reading operations of the optical disk apparatus.

6. A method for enhancing an access time in an optical disk apparatus for writing and reading data to and from a recording medium having a plurality of tracks, comprising the steps of:

determining the accuracy of a track jump operation to obtain a control condition that provides a track jumping operation from a starting track on said recording medium toward a target track on said recording medium at intervals corresponding to a number of tracks between said starting track and said target track; and controlling said track jump operation using said control condition derived from the results of said determined accuracy of the track jump operation during one of said writing and reading operations.

7. The method according to claim 6, wherein said step of determining is not performed during said writing and reading operations of said optical disk apparatus.

8. A method for decreasing the access time in an optical disk apparatus for writing and reading data to and from a recording medium having a plurality of tracks, comprising the steps of:

determining a maximum operating range for a right-and-left movement of an optical system of said optical disk apparatus, said right-and-left movement being perpendicular to an optical axis of said optical system;

determining the accuracy of a track jump operation to obtain a control condition that provides a track jumping operation from a starting track on said recording medium toward a target track of said recording medium at intervals corresponding to a number of tracks between said starting track and said target track; and controlling said track jump operation by using said control condition derived from the results of said determined maximum operation range and results of said determined accuracy of the track jump operation during one of said write and read operations.

9. The method according to claim 8, wherein said step of determining the maximum operating range further comprises the step of detecting a change in a focus system signal generated by a focus control within said optical disk apparatus, when said focus control cannot be performed.

10. The method according to claim 9, wherein said detected focus system signal is not generated when said right-and-left movement of said optical system reaches an operating limitation preventing said focus control from performing an up-and-down movement along the optical axis of said optical system.

11. The method according to claim 8, wherein said maximum operating range is determined by detecting a change in a focus system signal at a state where a focus control is not capable of being performed when said right-and-left movement of said optical system reaches an operating limitation which prevents said optical system from performing an up-and-down movement along the optical axis of said optical system.

12. The method according to claim 8, wherein said step of determining a maximum operating range and said step of determining the accuracy of a track jump operation are not performed during said writing and reading operations of said optical disk apparatus.

* * * * *